(12) United States Patent
Park et al.

(10) Patent No.: US 12,393,098 B2
(45) Date of Patent: Aug. 19, 2025

(54) CAMERA DEVICE

(71) Applicant: LG INNOTEK CO., LTD., Seoul (KR)

(72) Inventors: Sang Ok Park, Seoul (KR); Sang Jun Min, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 237 days.

(21) Appl. No.: 18/026,254

(22) PCT Filed: Aug. 24, 2021

(86) PCT No.: PCT/KR2021/011312
§ 371 (c)(1),
(2) Date: Mar. 14, 2023

(87) PCT Pub. No.: WO2022/085920
PCT Pub. Date: Apr. 28, 2022

(65) Prior Publication Data
US 2023/0333444 A1 Oct. 19, 2023

(30) Foreign Application Priority Data

Oct. 19, 2020 (KR) ........................ 10-2020-0135298

(51) Int. Cl.
| | | |
|---|---|---|
| G03B 5/00 | (2021.01) |
| G01K 7/22 | (2006.01) |
| G02B 27/64 | (2006.01) |
| G03B 17/17 | (2021.01) |
| H04N 23/68 | (2023.01) |

(52) U.S. Cl.
CPC ................. *G03B 5/00* (2013.01); *G01K 7/22* (2013.01); *G02B 27/646* (2013.01); *G03B 17/17* (2013.01); *H04N 23/685* (2023.01); *G03B 2205/003* (2013.01)

(58) Field of Classification Search
None
See application file for complete search history.

(56) References Cited

U.S. PATENT DOCUMENTS

| 2012/0019675 A1 | 1/2012 | Brown | |
|---|---|---|---|
| 2018/0321504 A1* | 11/2018 | Hu | G02B 7/09 |
| 2020/0073140 A1* | 3/2020 | Eddington | H04N 23/685 |
| 2020/0379242 A1* | 12/2020 | Li | G02B 23/08 |

(Continued)

FOREIGN PATENT DOCUMENTS

| JP | S6069744 U | * | 5/1985 |
|---|---|---|---|
| JP | 2012-517611 A | | 8/2012 |
| KR | 10-2016-0102803 A | | 8/2016 |

(Continued)

*Primary Examiner* — Rodney E Fuller
(74) *Attorney, Agent, or Firm* — Birch, Stewart, Kolasch & Birch, LLP

(57) ABSTRACT

A camera device including an actuating unit having a holder and a reflection member arranged in the holder. A fixed unit is spaced from the actuating unit. An SMA member is configured to move the actuating unit with respect to the fixed unit. An elastic member is electrically connected with the SMA member. In addition, when a current is applied to the SMA member, the SMA member tilts the actuating unit on the basis of a first axis and a second axis that is perpendicular to the first axis.

20 Claims, 10 Drawing Sheets

(56) References Cited

U.S. PATENT DOCUMENTS

| | | | | |
|---|---|---|---|---|
| 2020/0379243 A1* | 12/2020 | Li | ................... | G02B 23/08 |
| 2021/0223567 A1* | 7/2021 | Li | ................... | H04N 23/55 |

FOREIGN PATENT DOCUMENTS

| | | | | | |
|---|---|---|---|---|---|
| KR | 10-2019-0114588 A | | 10/2019 | | |
| KR | 102115583 B1 | * | 5/2020 | | |
| WO | WO-2018135732 A1 | * | 7/2018 | ............ | G02B 27/64 |
| WO | WO2020/114183 A1 | | 6/2020 | | |

\* cited by examiner

[FIG. 1]
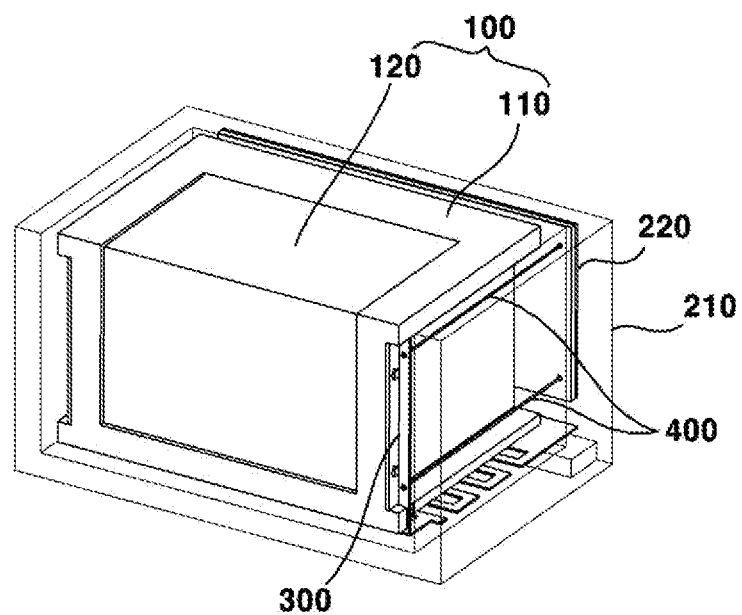

[FIG. 2]
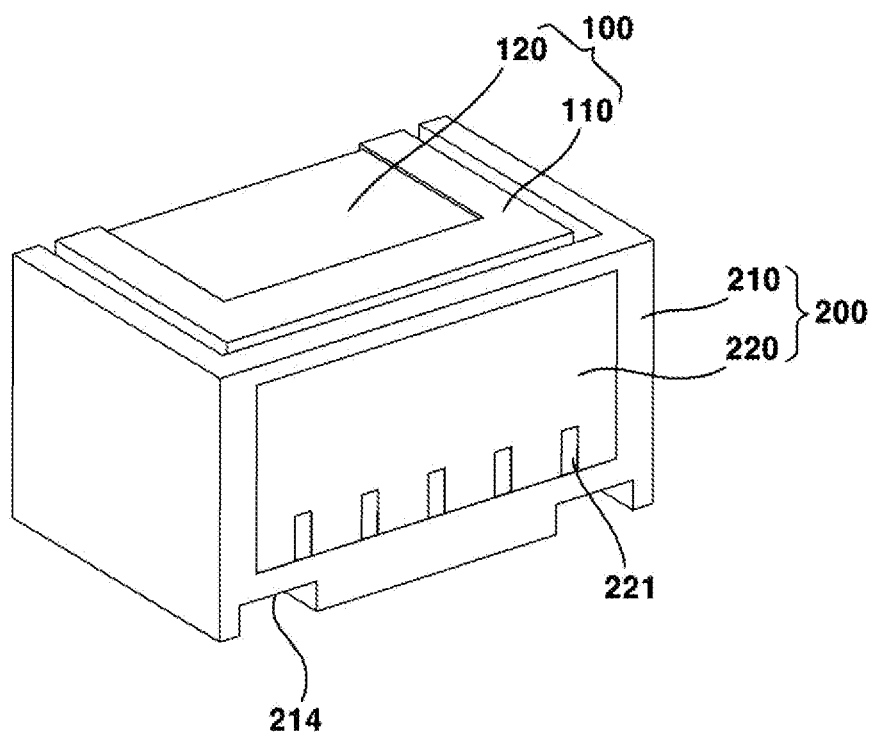

[FIG. 3]
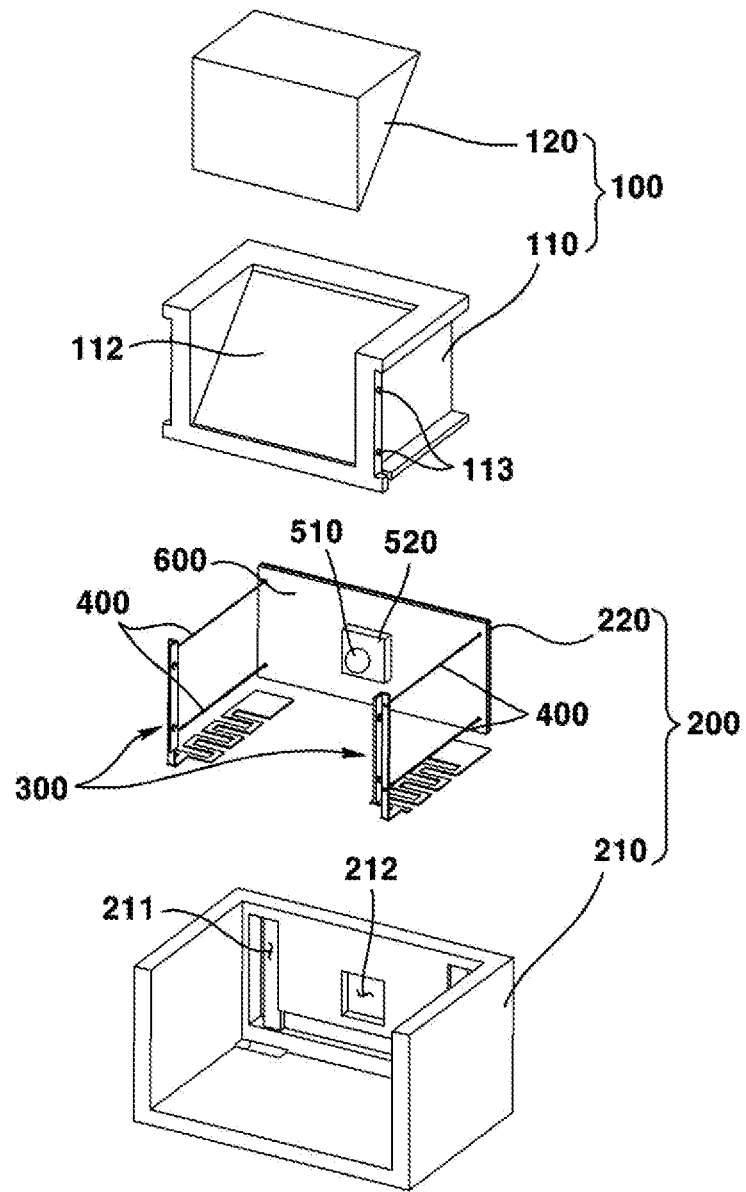

[FIG. 4]
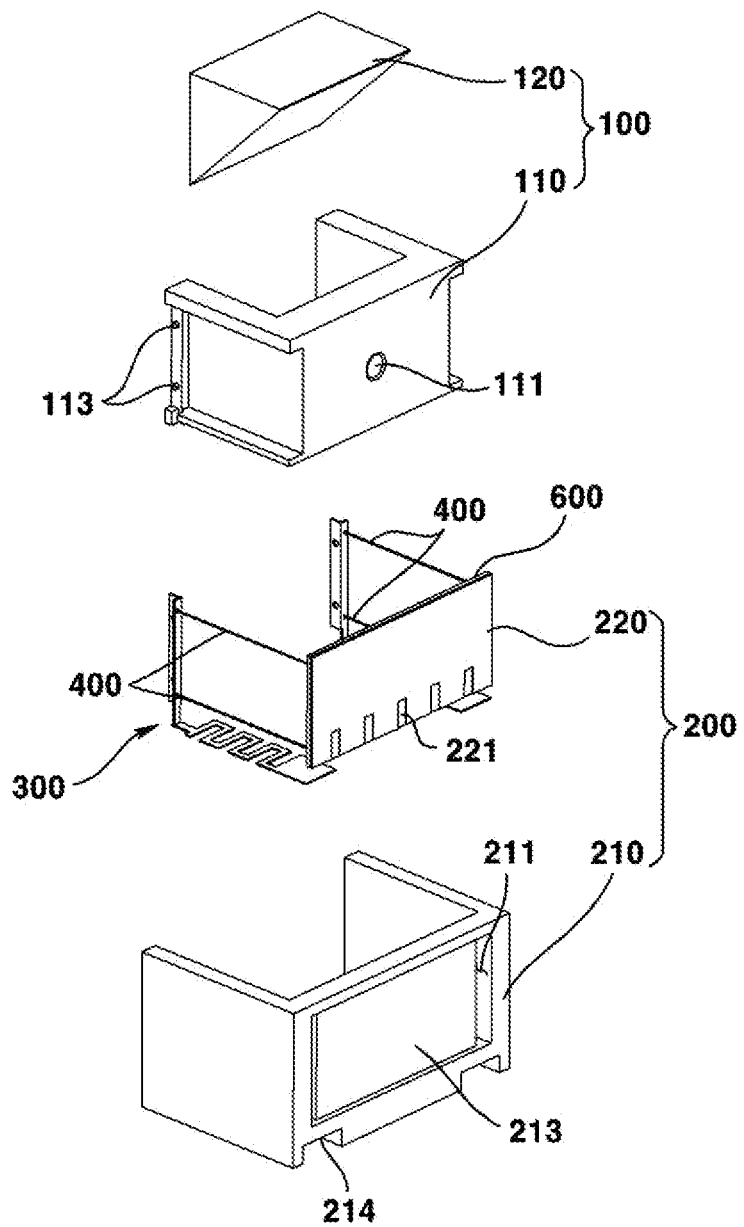

[FIG. 5]
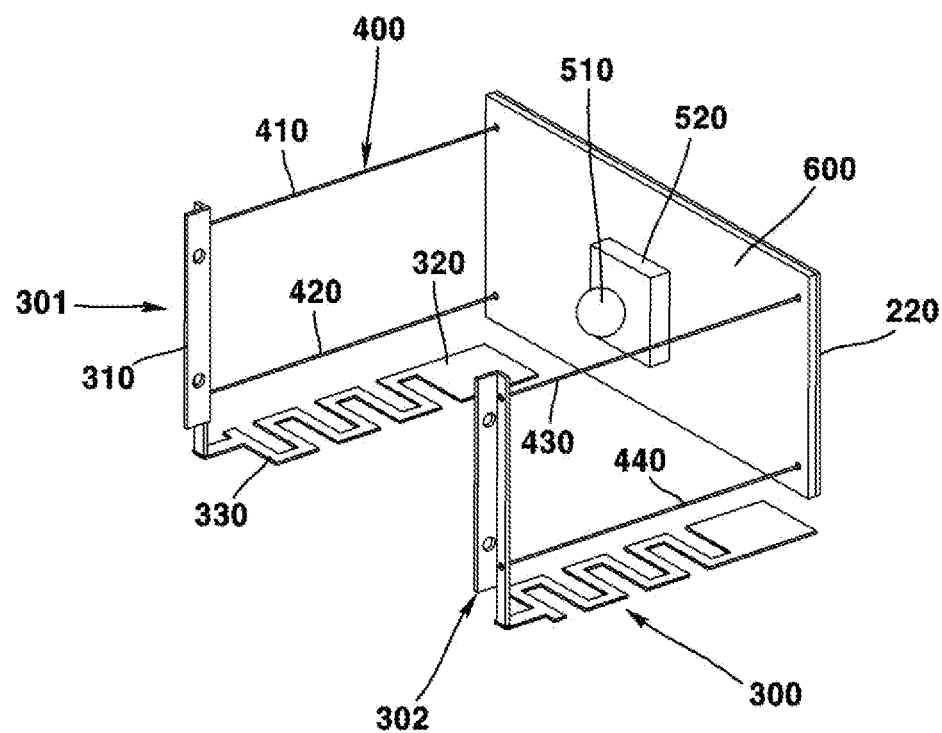

[FIG. 6]
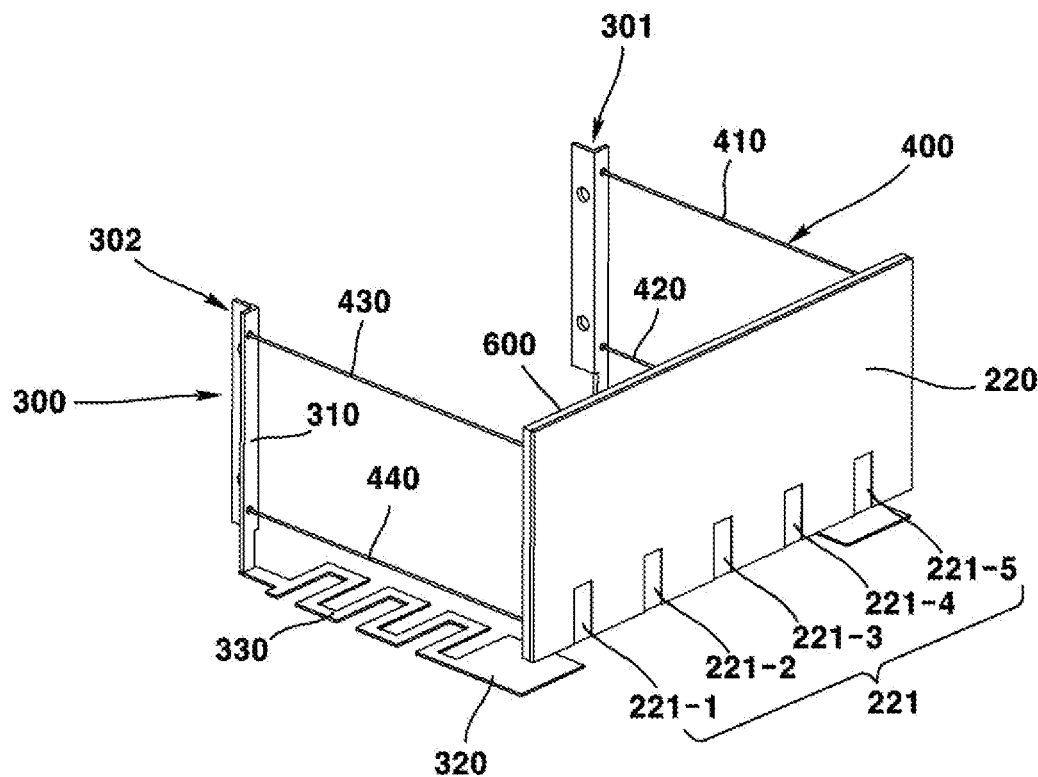
[FIG. 7]
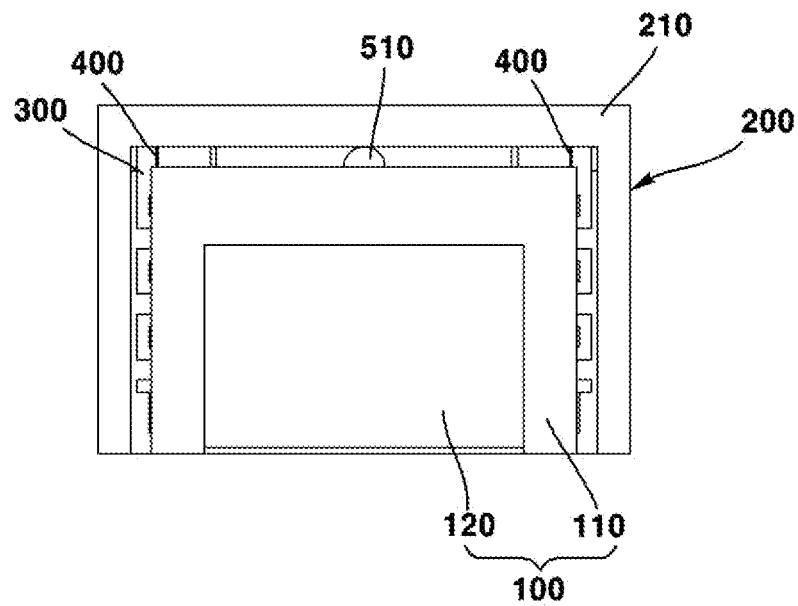

【FIG. 8】
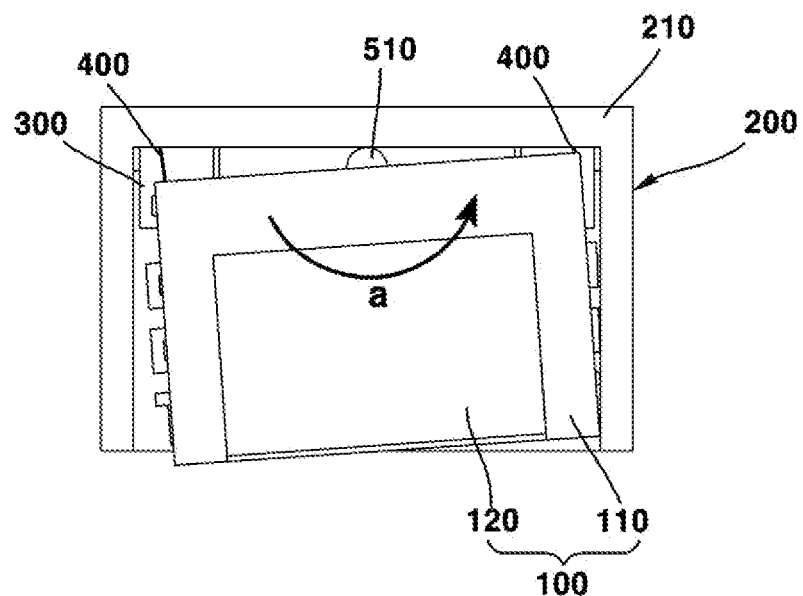
【FIG. 9】
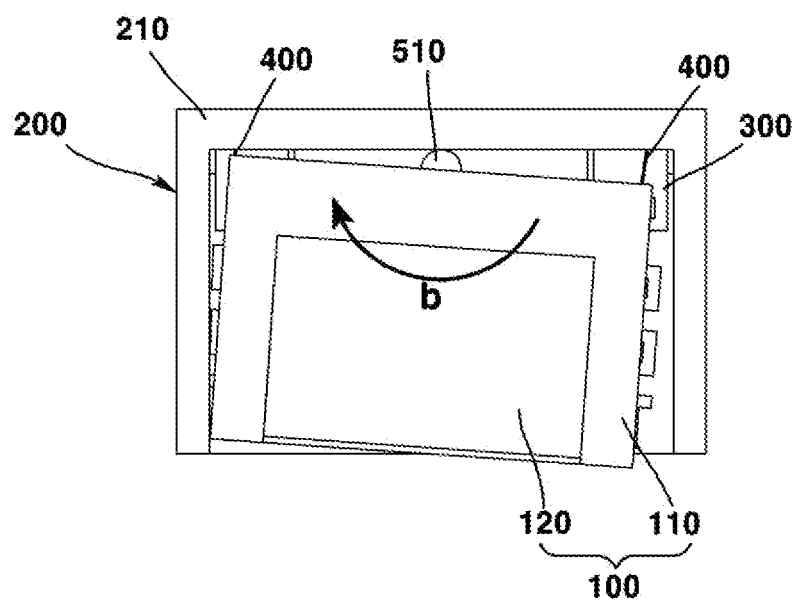

[FIG. 10]
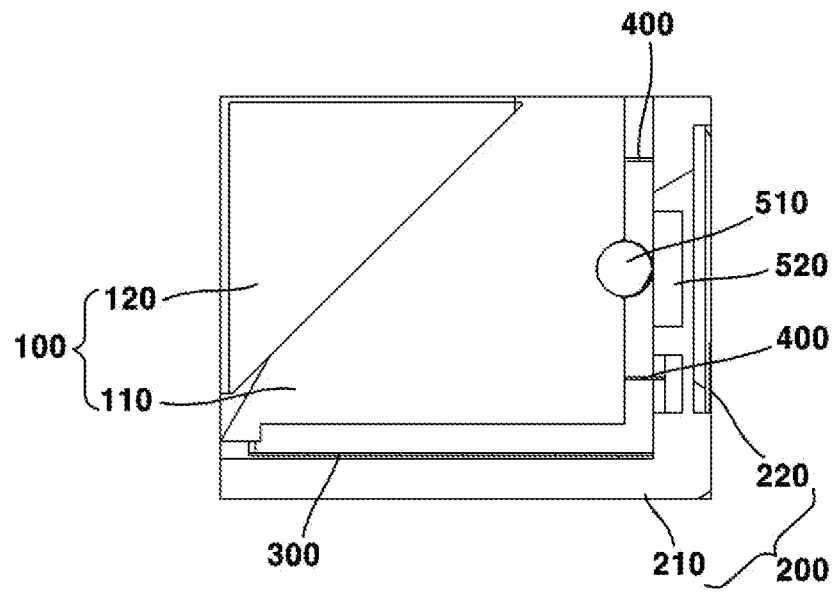
[FIG. 11]
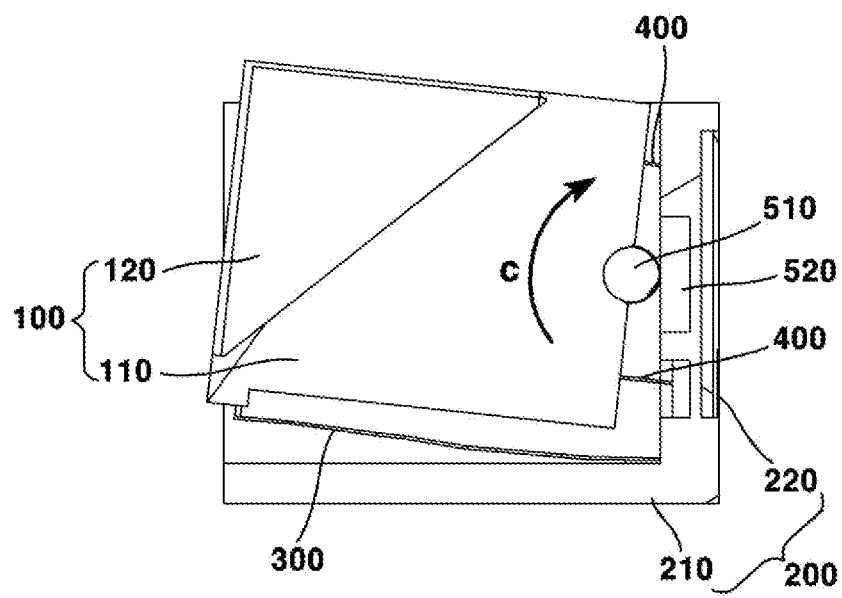

【FIG. 12】
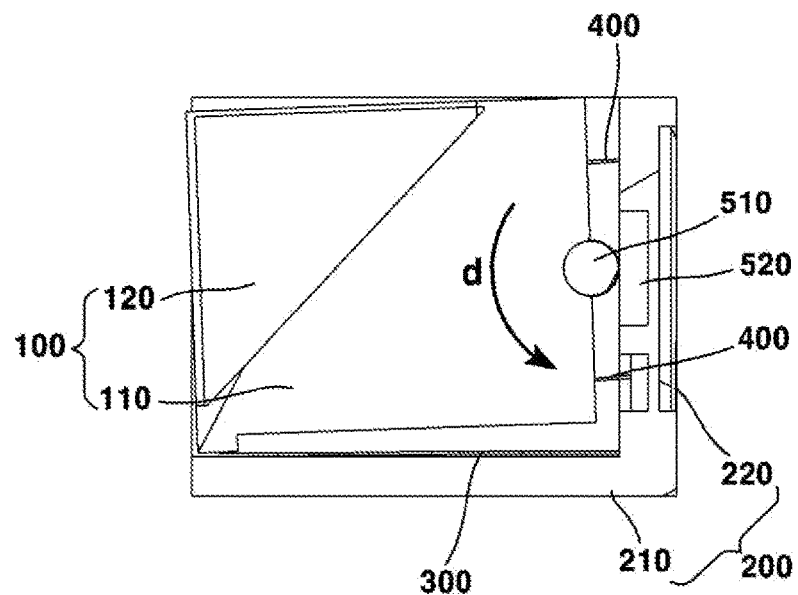
【FIG. 13】
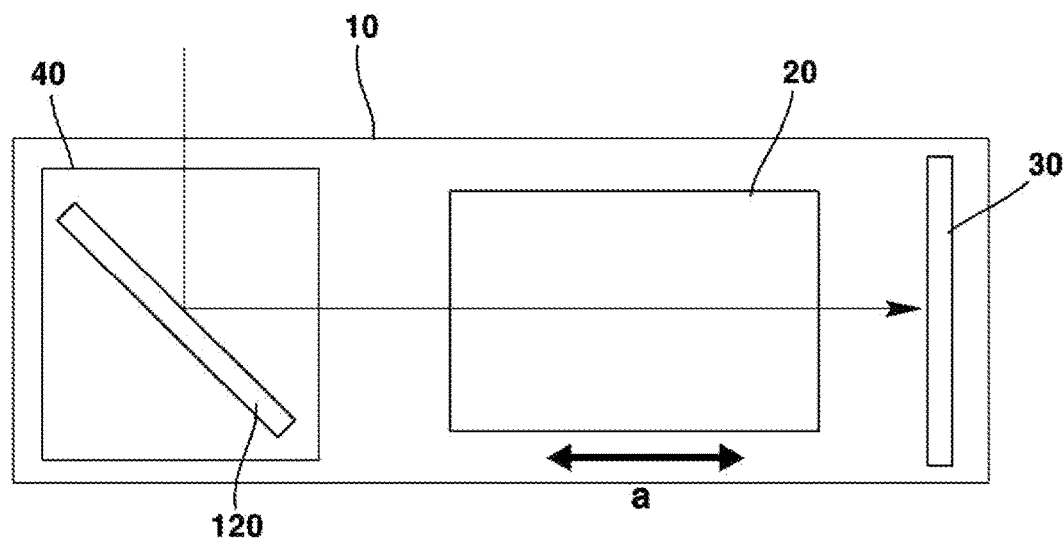

【FIG. 14】
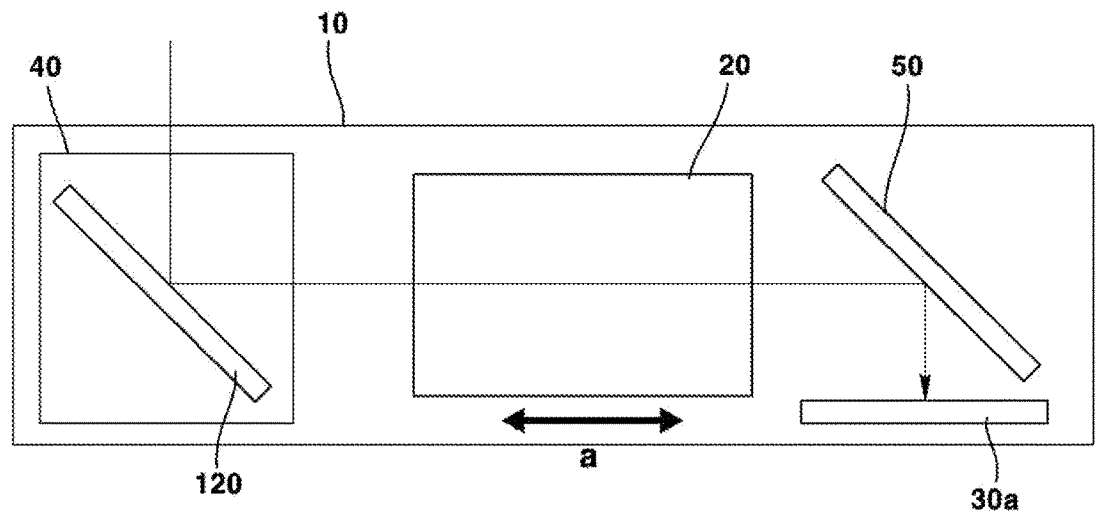
【FIG. 15】
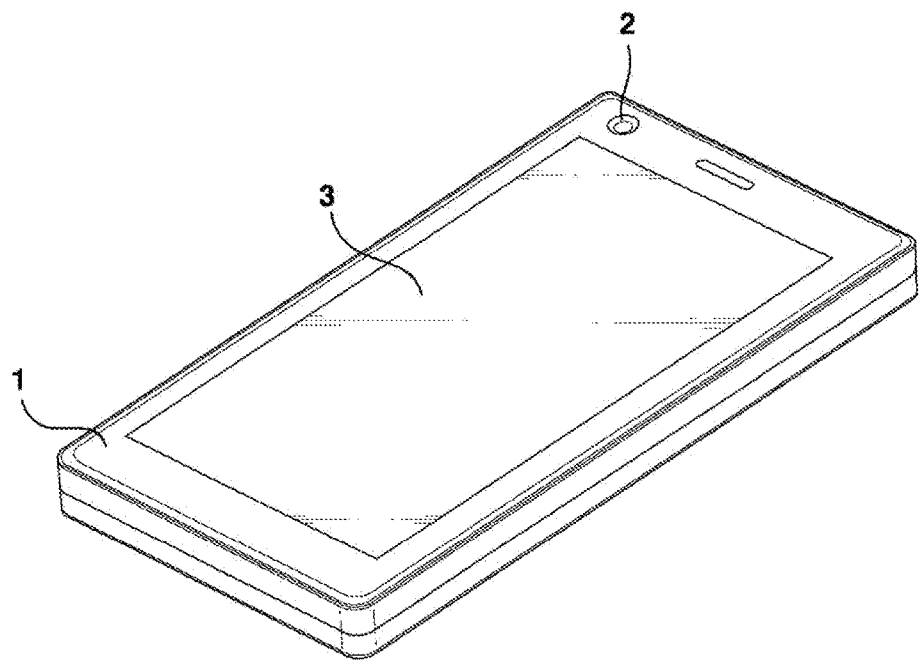

CAMERA DEVICE

CROSS REFERENCE TO RELATED APPLICATIONS

This application is the National Phase of PCT International Application No. PCT/KR2021/011312, filed on Aug. 24, 2021, which claims priority under 35 U.S.C. 119(a) to Patent Application No. 10-2020-0135298, filed in the Republic of Korea on Oct. 19, 2020, all of which are hereby expressly incorporated by reference into the present application.

TECHNICAL FIELD

The present embodiments relate to a camera device.

BACKGROUND OF THE INVENTION

A camera device is a device for taking pictures or videos of a subject and may be mounted on an optical instrument such as a smart phone, a drone, a vehicle and the like. The camera device may comprise an OIS (Optical Image Stabilization) function that corrects trembling or shaking of an image caused by movement of a user in order to increase the image quality, an AF (Auto Focus) function aligning a focus length of a lens by automatically adjusting a gap between an image sensor and the lens, and a zoom function that increases or decreases the magnification of distant subjects through zoom lenses.

Recently, the size of an image sensor and an aperture of a lens are increasing due to the enhancement of the function of mobile phone and the increase in the number of pixels. Furthermore, needs for high magnification zoom are increasing.

Therefore, researches are being conducted on a structure in which an optical path is bent using a prism and the prism is tilted to perform an OIS function for high magnification zoom.

DISCLOSURE

Technical Field

An exemplary embodiment of the present invention relates to a camera device comprising a structure for implementing the prism tilting using an SMA (Shape Memory Alloy).

Technical Solution

A camera device according to an exemplary embodiment of the present invention may comprise: a movable unit comprising a holder and a reflection member disposed in the holder; a fixed unit spaced from the movable unit; an SMA member for moving the movable unit with respect to the fixed unit; and an elastic member electrically connected with the SMA member, wherein, when a current is applied to the SMA member, the SMA member tilts the movable unit on the basis of a first axis and a second axis that is perpendicular to the first axis.

Preferably, the fixed unit may comprise a substrate, and the elastic member may electrically connect the SMA member and the substrate.

Preferably, the elastic member may be coupled to the movable unit and the SMA member may be coupled to the elastic member.

Preferably, the camera device may comprise a ball interposed between the movable unit and the fixed unit and the ball may guide the movable unit to tilt on the basis of the first axis and the second axis with respect to the fixed unit.

Preferably, the camera device may further comprise a magnet disposed on the substrate, wherein the ball may be disposed on the magnet by being formed with a metal.

Preferably, the camera device may further comprise a metal plate disposed on the substrate, wherein the ball may be disposed on the metal plate by being formed with a magnetic substance.

Preferably, one end portion of the SMA member may be coupled to the substrate and the other end portion of the SMA member may be coupled to the elastic member.

Preferably, the SMA member may comprise a first SMA wire disposed on one side of the holder, a second SMA wire disposed on the said one side of the holder and disposed underneath the first SMA member, a third SMA wire disposed on the other side of the holder, and a fourth SMA wire disposed on the said other side of the holder and disposed underneath the third SMA member, wherein the first to fourth SMA wires may be individually driven.

Preferably, one end portion of the first SMA wire and one end portion of the second SMA wire may be electrically connected through the elastic member.

Preferably, one end portion of the first SMA wire, one end portion of the second SMA wire, one end portion of the third SMA wire and one end portion of the fourth SMA wire may be electrically connected through the elastic member, while the other end portion of the first SMA wire, the other end portion of the second SMA wire, the other end portion of the third SMA wire and the other end portion of the fourth SMA wire may be mutually and electrically separated.

Preferably, the fixed unit may comprise a housing, and the elastic member may comprise a first part coupled to the SMA member, a second part disposed on the housing, and a third part connecting the first part and the second part, wherein the third part may comprise a shape that is plurally bent.

Preferably, the second part of the elastic member may be electrically connected to the substrate.

Preferably, the substrate may comprise a first surface facing the movable unit, wherein the first surface of the substrate may be disposed with a metal plate, and wherein the plate may comprise a first plate connected to the first SMA wire, a second plate connected to the second SMA wire, a third plate connected to the third SMA wire, and a fourth plate connected to the fourth SMA wire, and wherein the first to fourth plates may be mutually and electrically spaced apart.

Preferably, the substrate may comprise a first surface facing the movable unit, the said first surface of the substrate may be disposed with a metal plate, the metal plate may comprise a hole, and the SMA member may pass through the hole of the plate so as not to contact the plate.

Preferably, the camera device may comprise a thermistor disposed on the substrate to detect temperatures.

Preferably, the ball may be integrally formed with the holder, and a lubricant may be interposed between the ball and the magnet.

Preferably, an optical instrument may comprise: a body; a camera device disposed on the body; and a display disposed on the body to output an image using the camera device.

A camera device according to an exemplary embodiment of the present invention may comprise: a holder; a movable unit comprising a reflection member disposed on the holder;

a fixed unit comprising a substrate and spaced apart from the movable unit; an elastic member coupled to the movable unit; and an SMA member comprising a first end portion coupled to the substrate and a second end portion coupled to the elastic member, wherein the SMA member may comprise a first SMA wire disposed on one side of the holder, a second SMA wire disposed on one side of the holder and disposed underneath the first SMA wire, a third SMA wire disposed on the other side of holder, and a fourth SMA wire disposed on the other side of holder and disposed underneath the third SMA wire, wherein the first to fourth wires may be individually driven.

Advantageous Effects of the Invention

Through the exemplary embodiments of the present invention, the OIS function may be conducted in a zoom camera device by a prism tilting using the SMA.

BRIEF DESCRIPTION OF DRAWINGS

FIG. 1 is a perspective view of a prism driving device according to an exemplary embodiment of the present invention.

FIG. 2 is a perspective view of a prism driving device according to an exemplary embodiment of the present invention seen from a direction different from that of FIG. 1.

FIG. 3 is an exploded perspective view of a prism driving device according to an exemplary embodiment of the present invention.

FIG. 4 is an exploded perspective view of a prism driving device according to an exemplary embodiment of the present invention seen from a direction different from that of FIG. 3.

FIG. 5 is a perspective view illustrating a partial structure of a prism driving device according to an exemplary embodiment of the present invention.

FIG. 6 is a perspective view seen from a direction different from that of FIG. 5.

FIGS. 7 to 9 are schematic views for explaining the tilted driving of a movable unit on the basis of first axis.

FIGS. 10 to 12 are schematic views for explaining the tilted driving of a movable unit on the basis of second axis.

FIG. 13 is a conceptual view of a camera device according to an exemplary embodiment of the present invention.

FIG. 14 is a conceptual view of a camera device according to a modification.

FIG. 15 is a perspective view of an optical instrument according to an exemplary embodiment of the present invention.

BEST MODE

Hereinafter, exemplary embodiments of the present invention will be described in detail with reference to the accompanying drawings.

However, it should be noted that the technical ideas of the present invention should not be construed as limited to some of the explained exemplary embodiments but may be embodied in mutually different various shapes, and one or more elements may be selectively coupled or substituted among exemplary embodiments as long as within the scope of technical concept of the present invention.

Furthermore, unless otherwise defined, all terms (comprising technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and/or the present application.

Furthermore, the terms used in the following exemplary embodiments are not intended to limit the invention but to explain the exemplary embodiments.

As used herein, the singular forms intended to comprise the plural forms as well, unless the context clearly indicates otherwise, and when it is described as at least one of "A and (or) B, C (or one or more), it means that one or more combinations of all combinations made of A, B and C may be comprised.

Furthermore, it will be understood that, although the terms first, second, A, B, (a), (b), etc. may be used herein to describe various elements, these elements should not be limited by these terms. These terms are only used to distinguish one element from another element, and the essence, sequence or order of relevant elements is not limited by the terms.

Furthermore it will be understood that when an element is referred to as being "connected", "coupled" or "joined" to another element, it can be, directly or through intervening elements, "connected", "coupled" or "joined" to the other elements as well.

Furthermore, it will be understood that when an element is referred to as being "upper (above)" or "below (beneath)", the "upper (above)" or "below (beneath)" comprises not only two or more elements being directly "connected", "coupled" or "joined" to the other elements but also one or more elements being formed or disposed between two or more elements.

Furthermore, when spatially relative terms, such as "beneath" ("below"), "above" ("upper") and the like are given, it may comprise the meaning of not only the "above" ("upper") directions but also the meaning of "beneath" ("below").

An "optical axis direction" as used hereinafter may be defined as an optical axis direction of a lens in a state of being coupled to a lens driving device.

Therefore, the "optical axis direction" may correspond to an optical axis direction of an image sensor of a camera device.

An "auto focus function" as used hereinafter may be defined as a function of automatically matching a focus relative to a subject by adjusting a distance from an image sensor by moving a lens to an optical axis direction in order to obtain a clear image of the subject on the image sensor. Meantime, the "auto focus" may be interchangeably used with an AF (Auto Focus).

A "handshake correction function" as used hereinafter may be defined as a function of moving or tilting a lens to a direction perpendicular to an optical axis direction in order to offset vibration (motion) generated on the image sensor by an external force. Meantime, the "handshake (handshaking) correction" may be interchangeably used with an "OIS (Optical Image Stabilization)".

The "zoom function" as used hereinafter may be defined as a function of arbitrarily adjusting the size of subject even if photographing is made by simultaneously fixing a camera and a subject. The term of zooming toward a subject by a camera may be called a zoom-in, and conversely the term of zooming escaping from a subject may be called a zoom-out. The term of zoom-in may enlarge the subject while reducing the depth of view, and zoom-out may reduce the subject and increase the depth of view. The term of "zooming" may be interchangeably used with "zoom"

Hereinafter, a camera device according to an exemplary embodiment of the present invention will be described with reference to accompanying drawings.

FIG. 1 is a perspective view of a prism driving device according to an exemplary embodiment of the present invention, FIG. 2 is a perspective view of a prism driving device according to an exemplary embodiment of the present invention seen from a direction different from that of FIG. 1, FIG. 3 is an exploded perspective view of a prism driving device according to an exemplary embodiment of the present invention, FIG. 4 is an exploded perspective view of a prism driving device according to an exemplary embodiment of the present invention seen from a direction different from that of FIG. 3, FIG. 5 is a perspective view illustrating a partial structure of a prism driving device according to an exemplary embodiment of the present invention, FIG. 6 is a perspective view seen from a direction different from that of FIG. 5, FIGS. 7 to 9 are schematic views for explaining the tilted driving of a movable unit on the basis of first axis, FIGS. 10 to 12 are schematic views for explaining the tilted driving of a movable unit on the basis of second axis, FIG. 13 is a conceptual view of a camera device according to an exemplary embodiment of the present invention, and FIG. 14 is a conceptual view of a camera device according to a modification.

A camera device (2) may comprise a case (10). The case (10) may form an exterior shape of the camera device (2). The case (10) may accommodate a prism driving device (40) therein. The case (10) may accommodate a lens (20) therein. The case (10) may accommodate an image sensor (30) therein. The case (10) may comprise a hole through which a light incident on a reflection member (120) passes.

The camera device (2) may comprise a lens (20). The lens (20) may comprise a plurality of lenses. The camera device (2) may comprise a lens module. The lens module may comprise a plurality of lenses and a barrel fixing the plurality of lenses. The lens (20) may be disposed on a position corresponding to that of the image sensor (30). Any one or more of auto focus function and zoom function may be performed by allowing a lens (20) to be moved to an optical axis direction.

The camera device (2) may comprise a driving unit. The driving unit may move the lens (20) to an optical axis direction (see "a" of FIG. 13). The driving unit may comprise a coil and a magnet. Any one of the coil and the magnet may be disposed on a movable unit comprising the lens (20) and the other one may be disposed on a fixed unit. At this time, when a current is applied to the coil, the lens (20) may be moved by the electromagnetic interaction between the coil and the magnet.

The camera device (2) may comprise an image sensor (30). The image sensor (30) may be a structure in which a light having passed the lens (20) is incident on to capture an image. The image sensor (30) may be mounted on a PCB (Printed Circuit Board). The image sensor (30) may be electrically connected to the PCB. For example, the image sensor (30) may be coupled to the PCB using an SMT (Surface Mounting Technology). The image sensor (30) may be so disposed as to be consistent in optical axis with the lens (20). That is, an optical axis of image sensor (30) and an optical axis of lens (20) may be aligned. The image sensor (30) may convert the light irradiated to the effective image area of the image sensor (30) to an electrical signal. The image sensor (30) may be any one of the CCD (charge coupled device), the MOS (metal oxide semi-conductor), the CPD and the CID.

As a modification, the camera device (2) may be formed in a double folded method as shown in FIG. 14. The camera device (2) may comprise a reflection member (50). The reflection member (50) may be a prism. The reflection member (50) may be a mirror. The reflection member (50) may be a reflector. The reflection member (50) may reflect a light. The reflection member (50) may reflect a light having passed the lens (20) to an image sensor (30a). The image sensor (30a) may be disposed in a 90° rotated state when compared with the image sensor (30) of the present exemplary embodiment. The image sensor (30a) may be disposed to a horizontal direction. Although FIG. 14 depicts an exemplary embodiment that the image sensor (30a) is disposed underneath the reflection member (50), the present invention may be modified in various ways. For example, the image sensor (30a) may be disposed on the reflection member (50). In this case, the reflection member (50) may be so disposed as to allow the light having passed the lens (20) to be reflected above. Alternatively, the image sensor (30a) may be so disposed as to be positioned at a side of the reflection member (50). In this case, the reflection member (50) may be so disposed as to allow the light having passed the lens (20) to be reflected sideways.

The camera device (2) may comprise a prism driving device (40). The prism driving device (40) may move a reflection member (120). The prism driving device (40) may tilt the reflection member (120). The prism driving device (40) may perform an OIS function. The prism driving device (40) may perform the OIS function by tilting the reflection member (120). The prism driving device (40) may comprise four (4) SMA wires.

The camera device (2) may comprise a movable unit (100). The movable unit (100) may be a mover. The movable unit (100) may be disposed within a fixed unit (200). The movable unit (100) may be moved within the movable unit (200). The movable unit (100) may be tilted about or on the basis of at least two axes. The movable unit (100) may drive a pivot. The movable unit (100) may be tilted on the basis of a first axis. The movable unit (100) may be rotated on the basis of the first axis. The movable unit (100) may be tilted on the basis of a second axis which is perpendicular to the first axis. The movable unit (100) may be rotated on the basis of second axis.

The camera device (2) may comprise a holder (110). The movable unit (100) may comprise a holder (110). The holder (110) may be disposed with a reflection member (120). The holder (110) may be brought into contact with a ball. The holder (110) may be moved relative to a housing (210). The holder (110) may be disposed within the housing (210).

The holder (110) may comprise a groove (111). The groove (111) may be a ball reception groove. The groove (111) may comprise a shape corresponding to that of a ball. The groove (111) may be disposed with a ball (510). The groove (111) may be concavely formed on a first lateral surface of the holder (110). The groove (111) may be a groove having a hemispherical shape. The groove (111) may accommodate at least a portion of the ball (510). The groove (111) may be rotatably disposed with a ball (510). The ball (510) may rotate without being disengaged from the groove (111).

The holder (110) may comprise a slope (112). The slope (112) may be disposed with a reflection member (120). The slop (112) may be so disposed as to be formed with an image sensor (30) at a 45° angle.

The holder (110) may comprise a protrusion (113). The protrusion (113) may be a coupled protrusion of elastic member. The protrusion (113) may be coupled with an elastic member (300). The protrusion (113) may be formed at a lateral surface of holder (110). The protrusion (113) may be coupled with a hole of the elastic member (300). The protrusion (113) may pass through a hole of the elastic member (300). An adhesive may be coated between the protrusion (113) and the elastic member (300).

The camera device (2) may comprise a reflection member (120). The movable unit (100) may comprise a reflection member (120). The reflection member (120) may be a prism. The reflection member (120) may be a mirror. The reflection member (120) may be reflector. The reflection member (120) may be disposed on a holder (110). The reflection member (120) may reflect a light. The reflection member (120) may reflect a light incident on through a hole of a case (10) to an image sensor (30).

The camera device (2) may comprise a fixed unit (200). The fixed unit (200) may be spaced apart from the movable unit (100). The fixed unit (200) may be a portion that is relatively fixed when the movable unit (100) is moved. The fixed unit (200) may be connected to the movable unit (100) through an SMA member (400). The fixed unit (200) may accommodate the movable unit (100) therein.

The camera device (2) may comprise a housing (210). The fixed unit (200) may comprise a housing (210). The housing (210) may be spaced apart from a holder (110). The housing (210) may be a portion that is relatively fixed when the holder (110) is moved. The housing (210) may be connected to the holder (110) through the SMA member (400). The housing (210) may accommodate the holder (110) therein.

The housing (210) may comprise a hole (211). The hole (211) may be a hole to allow the SMA member to pass therethrough. The hole (211) may be so formed as to allow the housing (210) to pass therethrough. The hole (211) may be disposed with an SMA member (400). The hole (211) may be so formed as to prevent the housing (210) from being interfered with the SMA member (400).

The housing (210) may comprise a first groove (212). The first grove (212) may be a magnet reception groove. The first groove (212) may be formed at an inner lateral surface of housing (210). The first groove (212) may be recessed from the inner lateral surface of housing (210). The first groove (212) may comprise a shape corresponding to that of a magnet (520). The first groove (212) may be formed with a depth corresponding to thickness of the magnet (520). Alternatively, the first groove (212) may be formed with a depth lower than thickness of the magnet (520). Alternatively, the first groove (212) may be formed with a depth deeper than thickness of the magnet (520).

The housing (210) may comprise a second groove (213). The second groove (213) may be a substrate reception groove. The second groove (213) may be disposed with a substrate (220). The second groove (213) may be formed on an external lateral surface of housing (210). The second groove (213) may be recessed from the external lateral surface of housing (210). The second groove (213) may comprise a shape corresponding to that of the substrate (220). The second groove (213) may be formed with a depth corresponding to thickness of substrate (220). Alternatively, the second groove (213) may be formed with a depth lower than the thickness of the substrate (220). Alternatively, the second groove (213) may be formed with a depth deeper than the thickness of substrate (220).

The housing (210) may comprise a third groove (214). The third groove (214) may be formed at a lower surface of housing (210). The third groove (214) may be recessed from a lower surface of housing (210). The third groove (214) may be opened toward an outside. The third groove (214) may be a structure for being fixed to a case (10) of camera device (2).

The camera device (2) may comprise a substrate (220). The fixed unit (200) may comprise a substrate (220). The substrate (220) may comprise an FPCB (flexible printed circuit board). The substrate (220) may be disposed on the housing (210). The substrate (220) may be coupled to the SMA member (400). The substrate (220) may be electrically connected to the SMA member (400). The substrate (220) may provide a current to the SMA member (400). The substrate (220) may comprise a first surface facing the movable unit (100). The first surface of substrate (220) may be disposed with a metal plate (600).

The substrate (220) may comprise a terminal (221). The terminal (221) may be formed at a lower end part of an external surface of substrate (220). The terminal (221) may electrically connect an outside element with the substrate (220).

The terminal (221) may comprise a plurality of terminals. The terminal (221) may comprise five (5) terminals. The terminal (221) may comprise first to fifth terminals (221-1, 221-2, 221-3, 221-4, 221-5). The first terminal (221-1) may be electrically connected to a first SMA wire (410). The second terminal (221-2) may be electrically connected to a second SMA wire (420). The third terminal (221-3) may be electrically connected to a third SMA wire (430). The fourth terminal (221-4) may be electrically connected to a fourth SMA wire (440). The fifth terminal (221-5) may be electrically connected to the first to fourth SMA wires (410, 420, 430, 440). The fifth terminal (221-5) may be a ground terminal.

The camera device (2) may comprise an elastic member (300). The elastic member (300) may be coupled to the movable unit (100). The elastic member (300) may be coupled to a holder (110). The elastic member (300) may have elasticity at least on a portion thereof. The elastic member (300) may have flexibility. The elastic member (300) may have elasticity. The elastic member (300) may comprise a portion having elasticity. The elastic member (300) may connect the movable unit (100) with the fixed unit (200). The elastic member (300) may connect the holder (110) with the housing (210). The elastic member (300) may elastically connect the holder (110) with the housing (210). The elastic member (300) may movably support the holder (110) relative to the housing (210). The elastic member (300) may be connected to the SMA member (400). The elastic member (300) may be coupled to the SMA member (400). The elastic member (300) may be electrically connected to the SMA member (400). The elastic member (300) may electrically connect the SMA member (400) and the substrate (220). The elastic member (300) may connect the SMA member (400) and the substrate (220).

In a modification, the elastic member (300) may be omitted and instead a conductive member may be disposed. The conductive member may be a terminal. The terminal may connect the SMA member (400) with the substrate (220). The terminal may electrically connect the SMA member (400) with the substrate (220).

The elastic member (300) may comprise a plurality of elastic members. The elastic member (300) may comprise two elastic members. The elastic member (300) may comprise first and second elastic members (301, 302). The elastic member (300) may comprise a first elastic member (301) disposed on one side of holder (110), and a second elastic member (302) disposed on the other side of holder (110). The first elastic member (301) may be coupled to the first and second SMA wires (410, 420). The second elastic member (302) may be coupled to the third and fourth SMA wires (430, 440). The first elastic member (301) may be electrically connected to first and second SMA wires (410, 420). The second elastic member (302) may be electrically connected to the third and fourth SMA wires (430, 440).

The elastic member (300) may comprise a first portion (310). The first portion (310) may be coupled to the SMA member (400). The first portion (310) may be coupled to the movable unit (100). The first portion (310) may be coupled to the holder (110). The first portion (310) may be fixed to the holder (110). The first portion (310) may comprise a hole. The hole of the first portion (310) may be coupled to a protrusion (113) of holder (110).

The elastic member (300) may comprise a second portion (320). The second portion (320) may be disposed on the housing (210). The second portion (320) may be coupled to the housing (210). The second portion (320) may be fixed to the housing (210). The second portion (320) of elastic member (300) may be electrically connected to the substrate (220). The second portion (320) may comprise a hole coupled to the protrusion of the housing (210). The second portion (320) may be fixed to the housing (210) using an adhesive.

The elastic member (300) may comprise a third portion (330). The third portion (330) may connect the first portion (310) and the second portion (320). The third portion (330) may comprise a shape that is bent in plural times. The third portion (330) may comprise a bent portion. The third portion (330) may have elasticity. The third portion (330) may be elastically deformed when the movable unit (100) is moved. The third portion (330) may be spaced apart from the movable unit (100). The third portion (330) may be connected to the movable unit (100) through the first portion (310).

The camera device (2) may comprise SMA member (400). The SMA member (400) may comprise an SMA (shape memory alloy). The SMA member (400) may comprise a portion formed with an SMA. The SMA member (400) may be formed at least a portion that is formed with an SMA. The SMA member (400) may comprise an SMA wire. The SMA member (400) may move the movable unit (100). The SMA member (400) may move the movable unit (100) relative to the fixed unit (200). The SMA member (400) may be coupled to the elastic member (300). The SMA member (400) may electrically connect the substrate (220) with the elastic member (300). When a current is applied to the SMA member (400), the SMA member (400) may tilt the movable unit (100) on the basis of first axis and a second axis that is perpendicular to the first axis.

One distal end of SMA member (400) may be coupled to the substrate (220). The other distal end of SMA member (400) may be coupled to the elastic member (300). The SMA member (400) may connect the substrate (220) and the elastic member (300). The SMA member (400) may pass through a hole of plate (600) in order not to contact the plate.

The SMA member (400) may be used for driving within 100° to 110° temperatures in order to obtain the linearity. The SMA member (400) may comprise a section where length is shortened due to low resistance as the temperature rises.

The SMA member (400) may be fixed to the substrate (220) by being picked up. The SMA member (400) may be fixed to the substrate (220) by a method of being picked up. Alternatively, the SMA member (400) may be disposed with a separate terminal for being fixed to the substrate (220).

The SMA member (400) may comprise a plurality of SMA members. The SMA member (400) may comprise a plurality of SMA wires. the SMA member (400) may comprise four (4) SMA wires. The SMA member (400) may comprise first to fourth SMA wires (410, 420, 430, 440).

The SMA member (400) may comprise a first SMA wire (410) disposed on one side of holder (110), a second SMA wire (420) disposed on one side of holder (110) and disposed underneath the first SMA wire (410), a third SMA wire (430) disposed on the other side of holder (110), and a fourth SMA wire (440) disposed on the other side of holder (110) and disposed underneath the third SMA wire (430). The first SMA wire (410) may be spaced apart from the second SMA wire (420). The second SMA wire (420) may be spaced apart from the third SMA wire (430). The third SMA wire (430) may be spaced apart from the fourth SMA wire (440). The fourth SMA wire (440) may be spaced apart from the first SMA wire (410). The first to fourth SMA wires (410, 420, 430, 440) may be individually driven. As a modification, the first to fourth SMA wires (410, 420, 430, 440) may be controlled by two pairs.

One distal end of first SMA wire (410) and one distal end of second SMA wire (420) may be electrically connected through the elastic member (300). At this time, the first SMA wire (410) and the second SMA wire (420) may be connected to the ground.

One distal end of first SMA wire (410), one distal end of second SMA wire (420), one distal end of third SMA wire (430) and one distal end of fourth SMA wire (440) may be electrically connected through the elastic member (300). At this time, the other distal end of first SMA wire (410), the other distal end of second SMA wire (420), the other distal end of third SMA wire (430) and the other distal end of fourth SMA wire (440) may be mutually and electrically separated.

The camera device (2) may comprise a guide unit. The guide unit may guide the movement of movable unit (100) when the movable unit (100) is moved relative to the fixed unit (200). The guide unit may provide a tilting center relative to the movable unit (100). The guide unit may provide a pivoting center relative to the movable unit (100). The guide unit may provide a rotating center relative to the movable unit (100).

The camera device (2) may comprise a ball (510). The ball (510) may be interposed between the movable unit (100) and the fixed unit (200). The ball (510) may guide the movable unit (100) to tilt relative to the fixed unit (200) on the basis of a first axis and a second axis that is perpendicular to the first axis. The ball (510) may be formed with a metal. The ball (510) may be disposed on a magnet (520). In a modification, the ball (510) may be integrally formed with a holder (110). The ball (510) may provide a tilting center relative to the movable unit (100). The ball (510) may provide a pivoting center relative to the movable unit (100). The ball (510) may provide a rotating center relative to the movable unit (100). In a modification, the ball (510) may take a hemispherical shape that is integrally formed with the holder (110). The ball (510) may take a hemispherical shape fixed to the holder (110). Alternatively, the ball (510) may take a hemispherical shape integrally formed with the housing (210). The ball (510) may take a hemispherical shape fixed to the housing (210). The ball (510) may be formed with a pivot.

At least one portion of the ball (510) may be disposed on the holder (110). At least one of the ball (510) may be accommodated into the holder (110). At least one portion of the ball (510) may be disposed on a grove (111) of holder (110). In a modification, at least one portion of the ball (510) may be disposed on the housing (210). At least one portion of the ball (510) may be accommodated into the housing (210). The housing (210) may be formed with a groove that accommodates a portion of the ball (510). The ball (510) may be disposed on the groove of housing (210).

The camera device (2) may comprise a magnet (520). The magnet (520) may be disposed on a substrate (220). The magnet (520) may be disposed on the housing (210). The magnet (520) may be disposed on a first groove (212) of housing (210). An attraction may be applied between the magnet (520) and a metal ball (510), through which the magnet (520) prevents the ball (510) from being disengaged from the magnet (520) to thereby maintain a contacted state even when the movable unit (100) is moved.

The camera device (2) may comprise a lubricant. The lubricant may be interposed between the ball (510) and the magnet (520). The lubricant may be so treated as to allow the surface roughness of ball (510) and/or the surface roughness of magnet to be excellent. The lubricant may comprise grease.

As a modification, the camera device (2) may comprise a metal plate. The metal plate may be disposed on a substrate (220). At this time, the ball (510) may be formed with a magnetic substance, and may be disposed on the metal plate. Even in this case, an attraction may be applied between the ball (510) of magnet and the metal plate, through which the ball (510) is prevented from being disengaged from the metal plate even when the movable unit (100) is moved to thereby allow maintaining a contacted state. The metal plate may have magnetism. The metal plate may not have magnetism to allow applying attraction with the magnet.

The camera device (2) may comprise a plate (600). The plate (600) may be a yoke. The plate (600) may be formed with a metal. The plate (600) may be disposed on a first surface of substrate (220). The plate (600) may comprise a hole. The hole of the plate (600) may be disposed with an SMA member (400). The hole of plate (600) may be formed to prevent interference with the SMA member (400).

As a modification, the plate (600) may comprise a first plate connected to the first SMA wire (410), a second plate connected to the second SMA wire (420), a third plate connected to the third SMA wire (430), and a fourth plate connected to the fourth SMA wire (440). At this time, the first to fourth plates may be mutually spaced apart.

The camera device (2) may comprise a thermistor. The thermistor may detect temperatures. The thermistor may be disposed on a substrate (220). The thermistor may detect temperatures. The thermistor may be disposed on a plate (600) or on a substrate (220) to detect an interior temperature of prism driving device (40).

In order to use feedback of resistance at the SMA member (400), an accurate resistance value must be ascertained, where the resistance is changed according to temperatures such that a temperature element such as a thermistor can be applied to the prism driving device (40), the camera device (2) or a mobile phone. The controller may correct a current applied to the SMA member (400) using a predetermined Table through the measured temperatures. The resistance may be measured by a driver. The camera device (2) may comprise a driver for measurement of resistance.

The camera device (2) according to an exemplary embodiment of the present invention may comprise both the elastic member (300) and the substrate (220) together. The camera device (2) in a modification may comprise the elastic member (300) without the substrate (220). In this case, the elastic member (300) may be electrically connected to an external electric power. The elastic member (300) may apply a current to the SMA member (400). In another modification, the camera device (2) may comprise a substrate (220) without the elastic member (300). At this time, the substrate (220) may apply a current to the SMA member (400). Both ends of the SMA member (400) may be all coupled to the substrate (220). For example, both ends of SMA member (400) may be coupled to the substrate (220), and a middle portion of the SMA member (400) may be bent to be hitched at the movable unit (100).

Hereinafter, the driving of the prism driving device will be explained according to an exemplary embodiment of the present invention.

TABLE 1

| | First SMA wire | Second SMA wire | Third SMA wire | Fourth SMA wire | driving |
|---|---|---|---|---|---|
| case 1 | reduce | keep | reduce | keep | Driving to negative (−) direction on the basis of y axis |
| case 2 | keep | reduce | keep | reduce | Driving to positive (+) direction on the basis of y axis |
| case 3 | keep | keep | reduce | reduce | Driving to positive (+) direction on the basis of x axis |
| case 4 | reduce | reduce | keep | keep | Driving to negative (−) direction on the basis of x axis |
| case 5 | keep | keep | keep | keep | centering |

The driving of the prism driving device (40) according to an exemplary embodiment of the present invention is explained as shown in the above Table. The first to fourth SMA wires (410, 420, 430, 440) of the prism driving device (40) may be individually driven. Although the expressions of "reduce" and "keep" are given in the above Table 1, the said expressions may be replaced with expressions meaning that length is short or long. In other words, the reduced SMA wire may be shorter than the kept SMA wire. In the exemplary embodiment, the reflection member (120) may be tilt-driven on the basis of x axis and y axis by differently controlling the four SMA wires. For the case 1, when the first SMA wire (410) is reduced, the second SMA wire (420) is kept, the third SMA wire (430) is reduced and the fourth SMA wire (440) is kept, the movable unit (100) may be driven to a negative (−) direction on the basis of y axis as shown in FIG. 11 (see "c" of FIG. 11).

For the case 2, when the first SMA wire (410) is kept, the second SMA wire (420) is reduced, the third SMA wire (430) is kept and the fourth SMA wire (440) is reduced, the movable unit (100) may be driven to a positive (+) direction on the basis of y axis as shown in FIG. 12 (see "d" of FIG. 12). At this time, the positive (+) direction is given to express that the positive (+) direction is opposite to the negative (−) direction. That is, the negative (−) direction may be a first direction and the positive (+) direction may be a second direction which is opposite to the first direction.

For the case 3, when the first SMA wire (410) is kept, the second SMA wire (420) is kept, and the third SMA wire (430) is reduced and the fourth SMA wire (440) is reduced, the movable unit (100) may be driven to the positive (+) direction on the basis of x axis as shown in FIG. 8 (see "a" of FIG. 8).

For the case 4, when the first SMA wire (410) is reduced, the second SMA wire (420) is reduced, the third SMA wire (430) is kept and the fourth SMA wire (440) is kept, the movable unit (100) may be driven to the negative (−) direction on the basis of x axis as shown in FIG. 9 (see "b" of FIG. 9). The x axis so far explained may be a first axis and the y axis may be a second axis.

Hereinafter, an optical instrument according to an exemplary embodiment will be explained with reference to the accompanying drawings.

FIG. 15 is a perspective view of an optical instrument according to an exemplary embodiment of the present invention.

The optical instrument may be any one of a hand phone, a mobile phone, a smart phone, a portable communication device, a portable smart device, a portable terminal, a digital camera, a computer, a notebook computer (laptop computer), a digital broadcasting terminal, a PDA (Personal Digital Assistant), a PMP (Portable Multimedia Player) and a navigation device. However, the kinds of optical instrument are not limited thereto, and any device capable of photographing an image or a photograph may be comprised in the optical instrument.

The optical instrument may comprise a body (1). The body (1) may form an external shape of the optical instrument. The body (1) may accommodate a camera device (2). A display (3) may be disposed on a first surface of body (1). For example, the first surface of body (1) may be disposed with a display (3) and a camera device (2), and a second surface which is opposite of the first surface of body (1) may be additionally disposed with a camera device (2).

The optical instrument may comprise a camera device (2). The camera device (2) may be disposed on a body (1). At least a portion of the camera device (2) may be accommodated within the body (1). The camera device (2) may be formed in a plural number. The camera device (2) may comprise a dual camera module, a triple camera module or more camera modules. The camera device (2) may be respectively disposed on the first surface of body (1) and the second surface of body (1) which is opposite to the first surface. The camera device (2) may capture or photograph an image and/or a video of subject.

The optical instrument may comprise a display (3). The display (3) may be disposed on a body (1). The display (3) may be disposed on the first surface of body (1). The display (3) may output an image and/or a video captured by the camera device (2).

Although the exemplary embodiments of the present invention have been explained with reference to the accompanied drawings, it should be understood by those skilled in the art that the present invention can be implemented in other detailed shapes without changes of technical ideas or essential characteristics. Thus, it should be understood that the hitherto explained exemplary embodiments are exemplary in all respects and not limited.

The invention claimed is:

1. A camera device comprising:
    a movable unit comprising a holder and a reflection member disposed on the holder;
    a fixed unit spaced from the movable unit, the fixed unit comprising a housing;
    an SMA member configured to move the movable unit with respect to the fixed unit; and
    an elastic member electrically connected with the SMA member, the elastic member comprising a first part coupled with the SMA member, a second part disposed on the housing; and a third part connecting the first part and the second part,
    wherein the third part comprises a shape that is plurally bent, and
    wherein, when a current is applied to the SMA member, the SMA member is configured to tilt the movable unit on the basis of a first axis and a second axis perpendicular to the first axis.

2. The camera device of claim 1, wherein the fixed unit comprises a substrate, and
    wherein the elastic member electrically connects the SMA member and the substrate.

3. The camera device of claim 2, comprising a ball disposed between the movable unit and the fixed unit,
    wherein the ball is configured to guide the movable unit to tilt on the basis of the first axis and the second axis with respect to the fixed unit.

4. The camera device of claim 3, comprising a magnet disposed on the substrate,
    wherein the ball is formed with a metal and disposed on the magnet.

5. The camera device of claim 4, wherein the ball is integrally formed with the holder, and
    wherein a lubricant is disposed between the ball and the magnet.

6. The camera device of claim 3, comprising a metal plate disposed on the substrate,
    wherein the ball is formed with a magnetic substance and disposed on the metal plate.

7. The camera device of claim 3, wherein one end portion of the SMA member is coupled to the substrate and the other end portion of the SMA member is coupled to the elastic member.

8. The camera device of claim 2, wherein the SMA member comprises a first SMA wire disposed on one side of the holder, a second SMA wire disposed on the one side of the holder and disposed below the first SMA member, a third SMA wire disposed on the other side of the holder, and a fourth SMA wire disposed on the other side of the holder and disposed below the third SMA member, and
    wherein the first to fourth SMA wires are individually driven.

9. The camera device of claim 8, wherein the substrate comprises a first surface facing the movable unit,
    wherein the first surface of the substrate is disposed with a metal plate,
    wherein the plate comprises a first plate connected to the first SMA wire, a second plate connected to the second SMA wire, a third plate connected to the third SMA wire, and a fourth plate connected to the fourth SMA wire, and
    wherein the first to fourth plates are mutually and electrically spaced apart.

10. The camera device of claim 2, wherein the second part of the elastic member is electrically connected to the substrate.

11. The camera device of claim 2, wherein the substrate comprises a first surface facing the movable unit,
    wherein the first surface of the substrate is disposed with a metal plate,
    wherein the plate comprises a hole, and
    wherein the SMA member passes through the hole of the plate so as not to contact the plate.

12. The camera device of claim 2, comprising a thermistor disposed on the substrate and configured to detect temperatures.

13. The camera device of claim 1, wherein the elastic member is coupled to the movable unit, and
wherein the SMA member is coupled to the elastic member.

14. The camera device of claim 1, wherein the SMA member comprises a first SMA wire disposed on one side of the holder, a second SMA wire disposed on the one side of the holder and disposed below the first SMA member, a third SMA wire disposed on the other side of the holder, and a fourth SMA wire disposed on the other side of the holder and disposed below the third SMA member, and
wherein one end portion of the first SMA wire and one end portion of the second SMA wire are electrically connected through the elastic member.

15. The camera device of claim 14, wherein the elastic member comprises a first elastic member coupled with the first and second SMA wires, and a second elastic member coupled with the third and fourth SMA wires.

16. The camera device of claim 1, wherein the SMA member comprises a first SMA wire disposed on one side of the holder, a second SMA wire disposed on the one side of the holder and disposed below the first SMA member, a third SMA wire disposed on the other side of the holder, and a fourth SMA wire disposed on the other side of the holder and disposed below the third SMA member,
wherein one end portion of the first SMA wire, one end portion of the second SMA wire, one end portion of the third SMA wire and one end portion of the fourth SMA wire are electrically connected through the elastic member, and
wherein the other end portion of the first SMA wire, the other end portion of the second SMA wire, the other end portion of the third SMA wire and the other end portion of the fourth SMA wire are mutually and electrically separated.

17. An optical instrument comprises:
a body;
the camera device of claim 1 disposed on the body; and
a display disposed on the body and configured to output an image photographed by the camera device.

18. A camera device comprising:
a movable unit comprising a holder and a reflection member disposed on the holder;
a fixed unit comprising a substrate and spaced apart from the movable unit;
an elastic member coupled to the movable unit;
an SMA member comprising a first end portion coupled to the substrate and a second end portion coupled to the elastic member; and
a thermistor disposed on the substrate and configured to detect temperatures,
wherein the SMA member comprises a first SMA wire disposed on one side of the holder, a second SMA wire disposed on the one side of the holder and disposed below the first SMA wire, a third SMA wire disposed on the other side of the holder, and a fourth SMA wire disposed on the other side of the holder and disposed below the third SMA wire, and
wherein the first to fourth SMA wires are individually driven.

19. A camera device comprising:
a fixed unit comprising a substrate;
a movable unit disposed on the fixed unit and comprising a reflection member;
an SMA member connecting the fixed unit and the movable and unit;
an elastic member connecting the fixed unit and the movable unit;
a ball disposed between the movable unit and the fixed unit; and
a magnet disposed on the substrate,
wherein the SMA member is configured to move the movable unit with respect to the fixed unit,
wherein the elastic member is electrically connected with the SMA member,
wherein the ball is configured to guide the movable unit to tilt on the basis of the first axis and the second axis with respect to the fixed unit, and
wherein the ball is formed with a metal and disposed on the magnet.

20. The camera device of claim 19,
wherein the elastic member electrically connects the SMA member and the substrate.

* * * * *